US012657395B2

(12) United States Patent
Chen et al.

(10) Patent No.: US 12,657,395 B2
(45) Date of Patent: Jun. 16, 2026

(54) METHODS AND SYSTEMS FOR AVOIDING OFFENSIVE LANGUAGE BASED ON PERSONAS

(71) Applicant: Toyota Research Institute, Inc., Los Altos, CA (US)

(72) Inventors: Francine R. Chen, Menlo Park, CA (US); Matthew Lee, Mountain View, CA (US); Scott Carter, San Jose, CA (US); Tatiana Lau, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 245 days.

(21) Appl. No.: 18/239,398

(22) Filed: Aug. 29, 2023

(65) Prior Publication Data

US 2025/0077783 A1 Mar. 6, 2025

(51) Int. Cl.
*G06F 40/35* (2020.01)
*G06F 40/117* (2020.01)
*G06F 40/166* (2020.01)
(52) U.S. Cl.
CPC ............ *G06F 40/35* (2020.01); *G06F 40/117* (2020.01); *G06F 40/166* (2020.01)
(58) Field of Classification Search
CPC ...... G06F 40/35; G06F 40/117; G06F 40/166; G06F 40/253; G06F 40/30
See application file for complete search history.

(56) References Cited

U.S. PATENT DOCUMENTS

| | | | |
|---|---|---|---|
| 6,460,074 B1 | 10/2002 | Fishkin | |
| 8,140,528 B2 | 3/2012 | Priebe | |
| 9,686,217 B2 | 6/2017 | Prabhu | |
| 11,032,222 B2 | 6/2021 | Fogu et al. | |
| 11,397,846 B1 * | 7/2022 | Freitas ................. | G06F 3/0481 |
| 2014/0250113 A1 | 9/2014 | Dallari et al. | |
| 2016/0342583 A1 * | 11/2016 | Cunico .................. | H04L 51/42 |
| 2019/0042557 A1 * | 2/2019 | Okubo ................. | G06F 40/253 |
| 2020/0053035 A1 * | 2/2020 | Mukherjee ............. | G06N 5/046 |
| 2020/0065381 A1 * | 2/2020 | Chui ........................ | G06F 40/30 |
| 2020/0125639 A1 * | 4/2020 | Doyle ..................... | G06F 40/30 |

(Continued)

FOREIGN PATENT DOCUMENTS

| | | |
|---|---|---|
| WO | 2003050645 A2 | 6/2003 |
| WO | 2023017308 A1 | 2/2023 |

*Primary Examiner* — Bhavesh M Mehta
*Assistant Examiner* — Philip H Lam
(74) *Attorney, Agent, or Firm* — Dinsmore & Shohl LLP

(57) ABSTRACT

Systems and methods disclosed include identifying a topic and a perspective of an input text to be sent to a receiver, determining a receiver perspective based on the topic of the input text and a receiver persona associated with the receiver, determining, by comparing the perspective of the input text and the perspective of the receiver, whether the input text includes a language having an offensive probability beyond an offensive probability threshold, after determining that the input text includes the language having the offensive probability beyond the offensive probability threshold, providing an option to modify the input text on a user interface of the sender, and modifying the input text to have the offensive probability below the offensive probability threshold when the option is selected.

18 Claims, 6 Drawing Sheets

(56) References Cited

U.S. PATENT DOCUMENTS

| | | | |
|---|---|---|---|
| 2021/0058352 A1* | 2/2021 | Fogu | G06F 40/279 |
| 2021/0157872 A1* | 5/2021 | David | G06F 16/9535 |
| 2022/0044676 A1* | 2/2022 | Noorizadeh | G10L 15/22 |
| 2024/0412029 A1* | 12/2024 | Yang | G06N 3/0475 |
| 2025/0232113 A1* | 7/2025 | Lord | G06F 40/35 |

* cited by examiner

METHODS AND SYSTEMS FOR AVOIDING OFFENSIVE LANGUAGE BASED ON PERSONAS

TECHNICAL FIELD

The present disclosure relates to natural language processing technologies, and more particularly, to natural language processing technologies for text.

BACKGROUND

The complexity of society shapes our individual knowledge and understanding, sometimes resulting in limitations to understand the expectations and sensitivities of others. This can lead to misunderstandings and unintentionally offensive remarks during conversations between individuals and groups. People may not realize that their words can hurt others. This issue occurs in user-to-user communication on different platforms. Therefore, a need exists for enhancing communication practices by minimizing the use of subtle offensive language.

SUMMARY

In a first aspect, a method includes identifying a topic and a perspective of an input text to be sent to a receiver, determining a receiver perspective based on the topic of the input text and a receiver persona associated with the receiver, determining, by comparing the perspective of the input text and the perspective of the receiver, whether the input text includes a language having an offensive probability beyond an offensive probability threshold, after determining that the input text includes the language having the offensive probability beyond the offensive probability threshold, providing an option to modify the input text on a user interface of the sender, and modifying the input text to have the offensive probability below the offensive probability threshold when the option is selected.

In a second aspect, a system includes a controller and a user interface. The controller performs operations including identifying a topic and a perspective of an input text to be sent to a receiver, determining a receiver perspective based on the topic of the input text and a receiver persona associated with the receiver, determining, by comparing the perspective of the input text and the perspective of the receiver, whether the input text includes a language having an offensive probability beyond an offensive probability threshold, after determining that the input text includes the language having the offensive probability beyond the offensive probability threshold, providing an option to modify the input text on a user interface of the sender, and modifying the input text to have the offensive probability below the offensive probability threshold when the option is selected.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
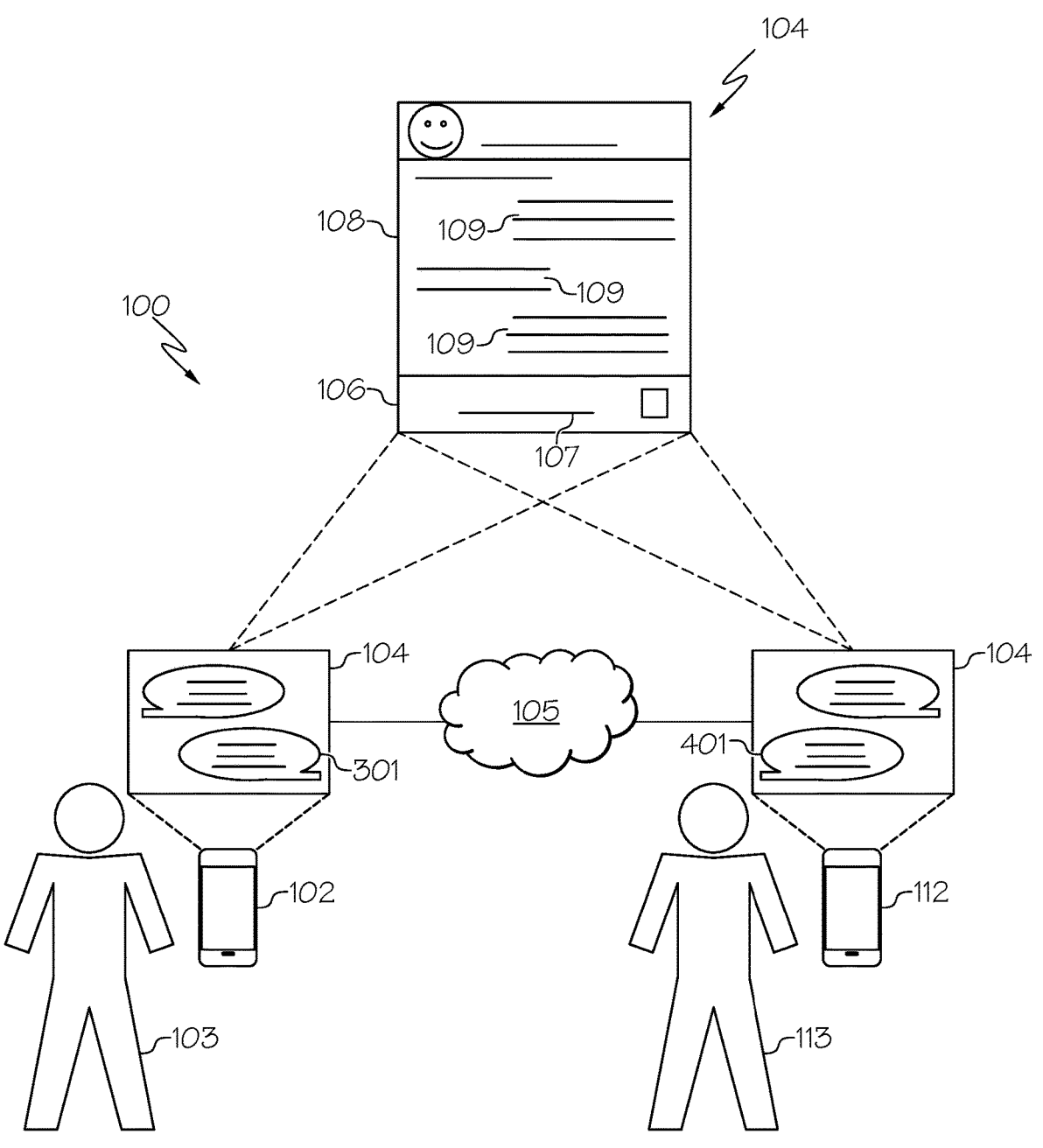
FIG. 1 schematically depicts an example persona guard system for avoiding offensive language based on personas, according to one or more embodiments shown and described herein.

The embodiments described herein are directed to systems and methods of avoiding offensive language based on personas. The system may identify whether any language in a text input by a sender is offensive to a receiver of the text based on the receiver's persona and provide an empathetic language to replace the offensive language in the text. The system may further provide reasons for the language being offensive to the receiver based on the personas of the receiver and reasons for the language being ambiguous to the sender so that the sender is not aware of the offensiveness based on the personas of the sender.

Offensive language may arise from the complex composition of society, including factors such as cultural background, income level, education level, and various aspects of identity like LGBTQ+ and gender. Some offensive language might be subtle and not immediately apparent, making it important to raise awareness and encourage improvements in communication. Thus, the offensiveness and the level of offensiveness vary from person to person. It may not be easy for a person to recognize that the language used by the person may offend the receiver of the text.

It may not be desired to depend on a platform that uses predefined rules and algorithms to identify offensive language based on recognized patterns or keywords, especially when it comes to detecting offensive language on a personal level. Such a platform does not consider the specific persona or profile of the readers or receivers. While the platform may be helpful in identifying and flagging common offensive language, the platform may not be able to capture more nuanced or context-dependent situations. The impact of language can vary depending on factors like cultural background, personal experiences, and individual sensitivities, which are unique to each person.

The systems and methods disclosed herein aid in identifying and reminding users of offensive language based on their personas. This could positively impact their relationships with others by promoting better communication. By providing real-time feedback or suggestions, the systems may assist the sender or the receiver in understanding the potential impact of their words and encourage them to choose a more inclusive and empathetic language. Further, the systems and the methods also provide means for the sender or the receiver to understand the diverse perspectives and experiences of each other, and therefore cultivate a broader cultural shift that values respectful and inclusive communication.

Various embodiments of the methods and systems for avoiding offensive language based on personas are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Throughout the disclosure, offensive language is any utterance that is blasphemous, obscene, indecent, insulting, hurtful, disgusting, morally repugnant, or that breaches commonly accepted standards of decent and proper speech. An offensive language may be found in a disparaging statement based on race, ethnicity, gender, religion, sexual orientation, disability, or any other personal attribute. Offensive language may vary depending on cultural, social, and individual perspectives, but it includes slurs, insults, discriminatory remarks, hate speech, or any form of language that seeks to demean or belittle others.

Turning to figures, FIG. 1 generally depicts the persona guard system 100 for avoiding offensive language based on personas. The persona guard system 100 for avoiding offensive language based on personas includes one or more controllers 101 and one or more user interfaces 104. The controller 101 may be a sender controller 102 or a receiver controller 112. The user interfaces 104 may be a user interface 104 of a sender 103 or a user interface 104 of a receiver 113. The sender 103 may use the sender controller 102 to input an input text 301 on the user interface 104. The sender controller 102 may identify whether the input text 301 contains any offensive language that is offensive to the receiver 113 of the input text 301. When the sender controller 102 determines that the input text 301 includes any offensive language to the receiver 113 based on the receiver persona, the input text 301 may be modified with empathetic language on the user interface 104 of the sender 103 and then sent to the receiver 113 via a connection 105. In embodiments, other controllers, such as the receiver controller 112, a controller of a server, or a controller of a third party, may perform similar activities as the sender controller 102 for avoiding offensive language based on personas. For example, the other controllers may identify whether a received text 104, or transmitting text through the connection 105 contains any offensive language that is offensive to the receiver 113, a potential reader, or a relevant third party based on the persona of the receiver 113, potential reader, or a relevant third party. The received text 104, transmitting text, or communication text may be modified with empathetic language. In some embodiments, after determining that the input text 301, the received text 401, or the transmitting text includes any offensive language to the receiver 113, the controller 101, including the sender controller 102, the receiver controller 112, a controller of a server, or a controller of a third party, may further provide an option to modify the input text 301 or the received text 401 with empathetic language on the user interface 104.

In embodiments, the sender 103 may be a natural person, an organization, an entity, a chatbot, an AI assistant, a notification system, or an internet of things (IoT) device. The sender 103 may compose and send the input text 301, such as messages or written communications, to one or more receivers 113. The sender 103 may send the input text 301 via, without limitation, email, instant messaging, social media platforms, or any other form of digital communication.

In embodiments, the receiver 113 may be a natural person, an entity, or an organization. The receiver 113 may receive and display the received text 401 on the user interface 104 of the receiver 113. The receiver 113 may also broadcast the received text 401 using a speaker or a headphone, or transfer the text into pins in braille cells using a Braille display.

In embodiments, the controller 101, including the sender controllers 102 and the receiver controllers 112, may be, without limitation, a computer, a laptop, a cell phone, a smartphone, a tablet, a wearable device such as a smartwatch or fitness tracker, a web-based messaging platform, or a voice assistance.

The user interface 104 includes the user interface 1-4 of the sender 103 and the user interface 104 of the receiver 113. The user interface 104 may be, without limitation, a monitor, a display, a touchscreen, a virtual keyboard, a voice input, or a web-based interface. The user interface 104 may be a text-based user interface, a human-machine interface (HMI), a brain-computer interface (BCI), a tactile user interface, a visual user interface, an auditory user interface, an olfactory user interface, an equilibria user interface, a gustatory user interface, a composite user interface (CUI) such as graphical user interface (GUI), a multimedia user interface (MUI), or other user interfaces available to send and receive text messages.

The user interface 104 may include, without limitation, input controls, display area, navigation elements, feedback and validation, dialogs and modals, layouts, and other components for the persona guard system 100 to avoid offensive language to be communicated to the receiver 113. In embodiments, the user interface 104 may include an input control for the sender 103 or the receiver 113 to provide input to the controller 101, such as, without limitation, text fields, checkboxes, radio buttons, dropdown menus, sliders, buttons, and touch gestures. The user interface 104 may further include a display area to present information, feedback, or output to the users, such as the sender 103 and receiver 113, including elements like, without limitation, text, images, icons, charts, graphs, tables, notifications, and status indicators. The user interface 104 may also include a navigation element for the sender 103 or the receiver 113 to move through different sections or screens within the user interface 104. The navigation element may include, without limitation, menus, tabs, breadcrumbs, sidebars, and hyperlinks. The user interface 104 may include feedback and validation to provide the sender 103 or the receiver 113 with information about the outcome of their actions or the current state of the text message system and the persona guard system 100. Feedback or validation may include, without limitation, tooltips, error messages, success notifications, progress bars, and validation indicators. The user interface 104 may include dialogs and modals as temporary pop-up windows that prompt the sender 103 or the receiver 113 for specific input, display additional information, or require users to make decisions.

In embodiments, the user interface 104 may include a text input field 106 and a composing area 107. The text input field may allow the sender 103 or the receiver 113 to type or enter the content of the input text. The text input field is where the sender 103 or the receiver 113 composes the text message the user intends to send. The composing area may allow the sender 103 or the receiver 113 to type and edit their message with more space and formatting options.

In embodiments, the user interface 104 may include a message display area 108 and a conversation thread 109. The message display area may display received text 401 in a designated message display area. This area may show the text message content, along with additional information such as the sender's name or phone number, timestamp, or other relevant details. The messages may be displayed as a conversation thread such that the sent and received texts are organized within a conversation thread or chat history. The conversation thread may allow the sender 103 or the receiver 113 to view and manage a chronological sequence of messages with a specific contact or group.

In embodiments, the input text 301 and the received text 401, may be, without limitation, a plain text, a rich text, an emoji, an emoticon, a multimedia message (MMS), an animated image, a voice message, or an attached file. A plain text may consist of alphanumeric characters and symbols. A rich text may include formatted text, such as bold, italics, underline, bullet points, or hyperlinks. An emoji or an emoticon may be a pictorial representation used to express emotions, ideas, or concepts within text messages. A multimedia message or multimedia Messages (MMS) may include various media formats within a text message, such as pictures, images, audio clips, videos, or animated GIFs. An animated image may be a sticker or a GIF image. A sticker may be pre-designed images or illustrations, while a GIF image may be short, looping animations. A voice message may be a recorded soundtrack, which the recipient can playback. A file attachment may be a document, an image, an audio file, or any other file format supported by the messaging app, platform, or device where the input text 301 and the received text 401 are sent and received.

In embodiments, the connection 105 is the physical or logical link between devices or systems to facilitate data communication. The connections 105 may be, without limitation, a wired connection such as Ethernet, a wireless connection such as WiFi, Bluetooth, near field communication (NFC), cellular connection such as GSM/3G/4G/5G/6G. The connection 105 allows the input text 301 to be transmitted from the sender controller 102 to the receiver controller 112.

Figure 2:
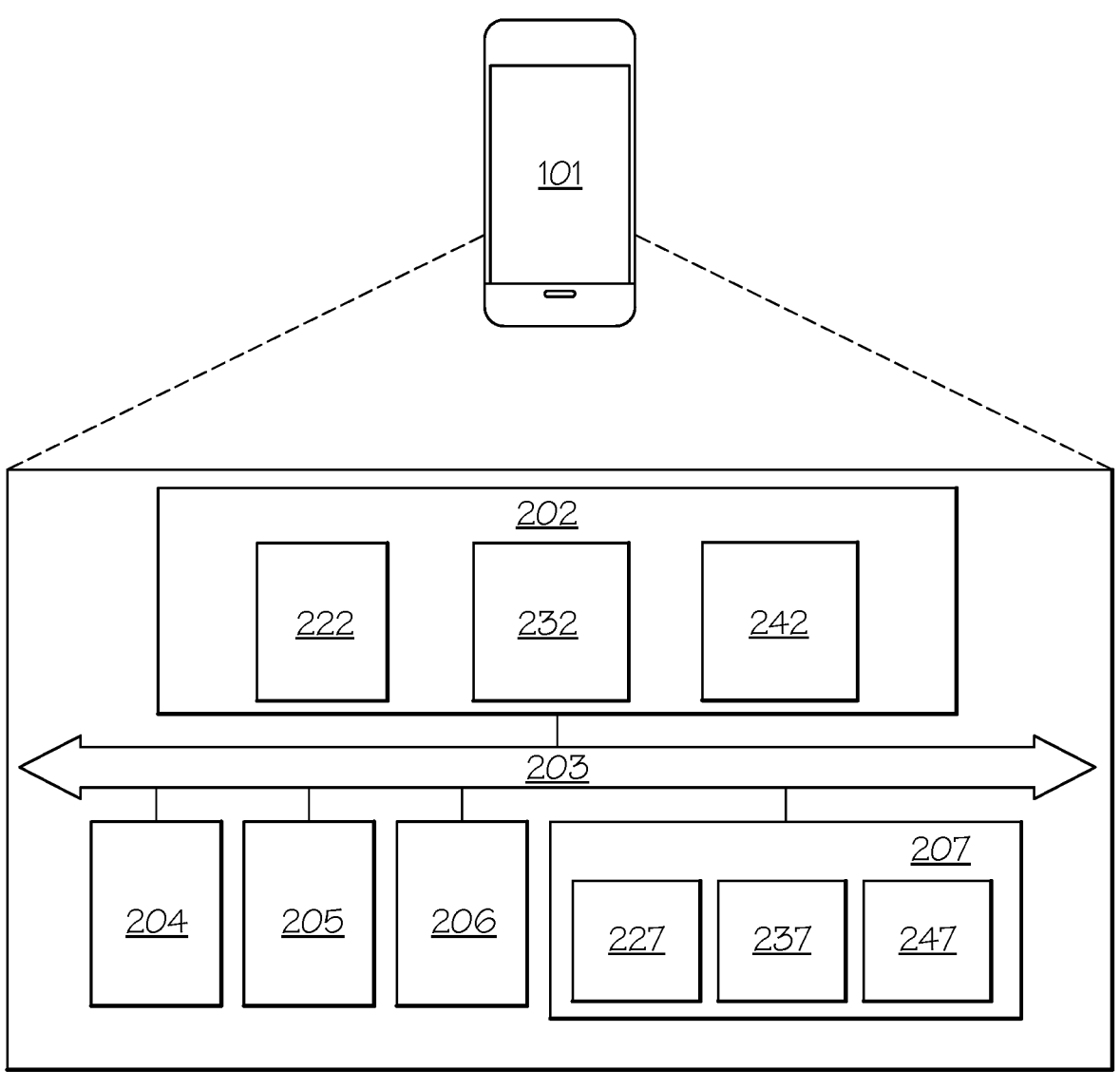
FIG. 2 schematically depicts non-limiting components of the devices on a controller of the persona guard system for avoiding offensive language based on personas, according to one or more embodiments shown and described herein.

Referring to FIG. 2, non-limiting components of the devices on a controller 101 of the persona guard system 100 for avoiding offensive language based on personas are depicted. The controller 101 may be a sender controller 102 or a receiver controller 112. The controller 101 may comprise a persona generator module 222, an insult detector module 232, and a personalized empathy text rewriter module 242. The controller 101 may comprise various components, such as a memory component 202, a processor 204, an input/output hardware 205, a network interface hardware 206, a data storage component 207, and a local interface 203.

The controller 101 may be any device or combination of components comprising a processor 204 and a memory component 202, such as a non-transitory computer readable memory. The processor 204 may be any device capable of executing the machine-readable instruction set stored in the non-transitory computer readable memory. Accordingly, the processor 204 may be an electric controller, an integrated circuit, a microchip, a computer, or any other computing device. The processor 204 may include any processing component(s) configured to receive and execute programming instructions (such as from the data storage component 207 and/or the memory component 202). The instructions may be in the form of a machine-readable instruction set stored in the data storage component 207 and/or the memory component 202. The processor 204 is communicatively coupled to the other components of the controller 101 by the local interface 203. Accordingly, the local interface 203 may communicatively couple any number of processors 204 with one another, and allow the components coupled to the local interface 203 to operate in a distributed computing environment. The local interface 203 may be implemented as a bus or other interface to facilitate communication among the components of the controller 101. In some embodiments, each of the components may operate as a node that may send and/or receive data. While the embodiment depicted in FIG. 2 includes a single processor, other embodiments may include more than one processor.

The memory component 202 (e.g., a non-transitory computer-readable memory component) may comprise RAM, ROM, flash memories, hard drives, or any non-transitory memory device capable of storing machine-readable instructions such that the machine-readable instructions can be accessed and executed by the processor 204. The machine-readable instruction set may comprise logic or algorithm(s) written in any programming language of any generation (e.g., 1GL, 2GL, 3GL, 4GL, or 5GL) such as, for example, machine language that may be directly executed by the processor 133, or assembly language, object-oriented programming (OOP), scripting languages, microcode, etc., that may be compiled or assembled into machine readable instructions and stored in the memory component 202. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory component 202 may be a machine-readable memory (which may also be referred to as a non-transitory processor-readable memory or medium) that stores instructions that, when executed by the processor 204, causes the processor 204 to perform a method or control scheme as described herein. While the embodiment depicted in FIG. 2 includes a single non-transitory computer-readable memory, other embodiments may include more than one memory module.

The input/output hardware 205 may include a monitor, keyboard, mouse, printer, camera, microphone, speaker, and/or other device for receiving, sending, and/or presenting data. The network interface hardware 206 may include any wired or wireless networking hardware, such as a modem, LAN port, Wi-Fi card, WiMax card, mobile communications hardware, and/or other hardware for communicating with other networks and/or devices.

The data storage component 207 can store personas 227, historical comments and input texts of the sender 237, and historical comments and received texts of the receivers 247. The historical comments and input texts of the sender 237 may include the input text drafted by the sender 103 and modified by the sender controller 102 (e.g. as illustrated in FIG. 1). The historical comments and received texts of the receivers 247 may include the received text modified by the receiver controller 112 (e.g. as illustrated in FIG. 1).

The memory component 202 may include the persona generator module 222, the insult detector module 232, and the personalized empathy text rewriter module 242. The persona generator module 222, the insult detector module 232, and the personalized empathy text rewriter module 242 may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in a field of machine learning, for example, is a class of deep, feed-forward ANNs applied for audio analysis of the recordings. CNNs may be shift or space invariant and utilize shared-weight architecture and translation.

Figure 3:
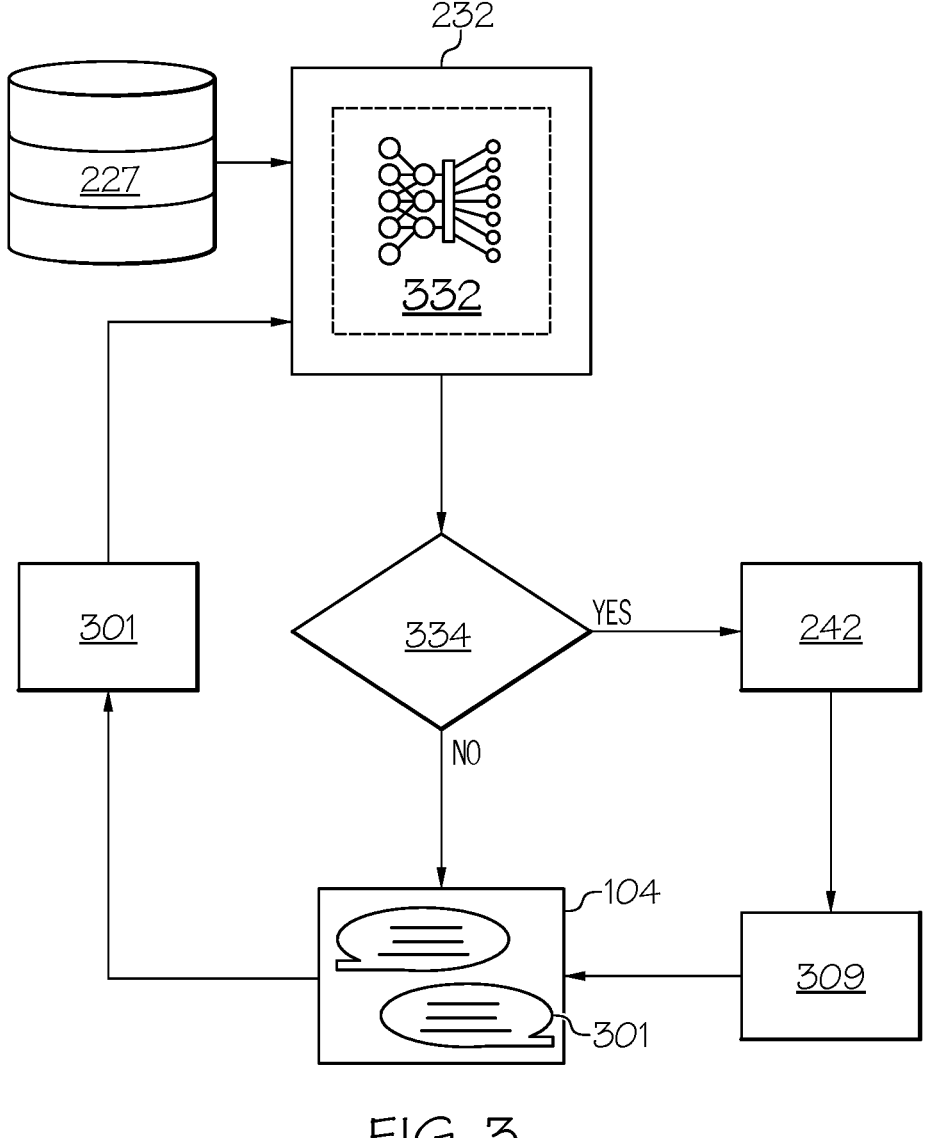
FIG. 3 schematically depicts an example block diagram of using the persona guard system for offensive language avoidance at the user interfaces of the sender, according to one or more embodiments shown and described herein.
Figure 4:
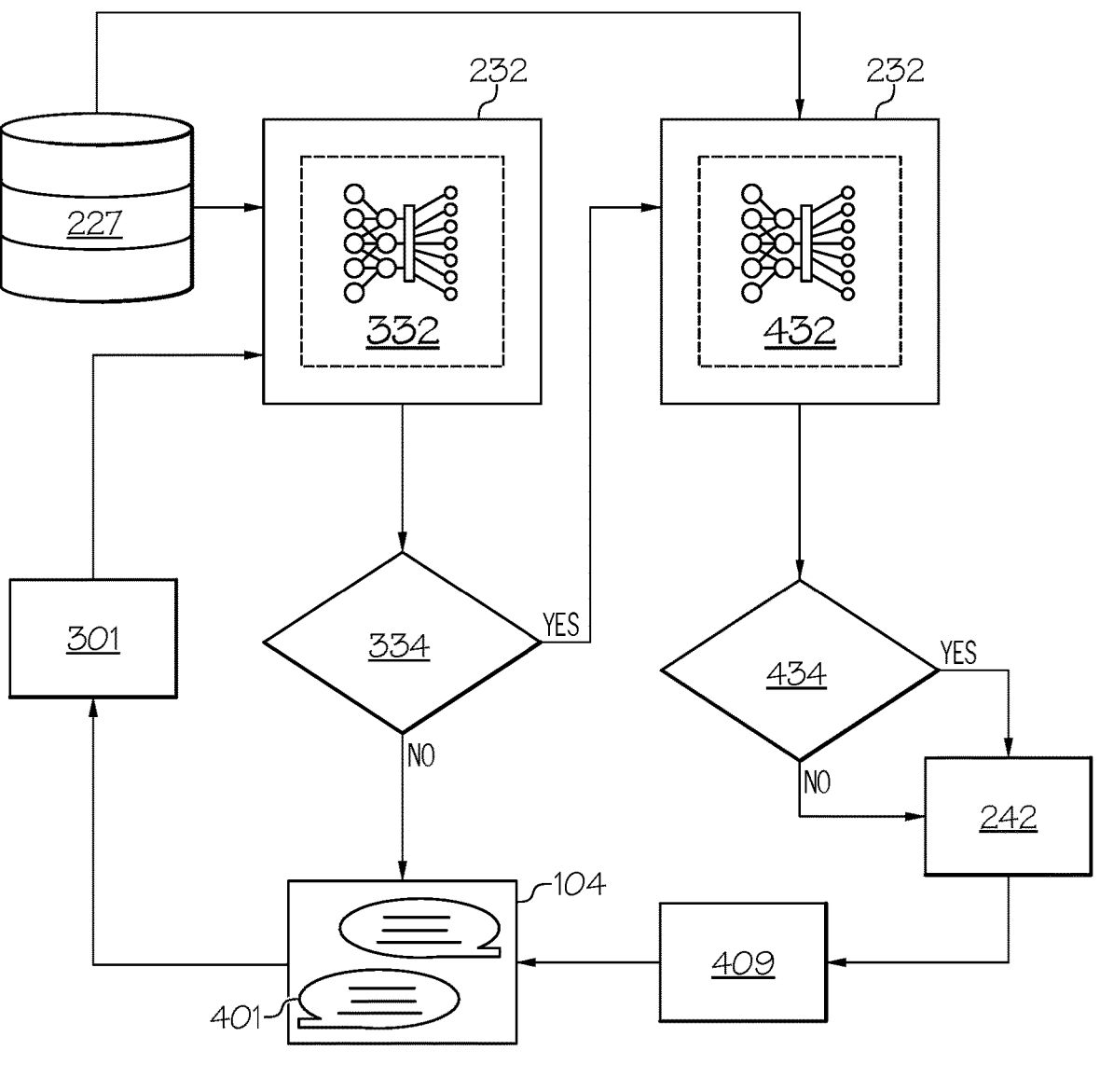
FIG. 4 schematically depicts an example block diagram of using the persona guard system for offensive language avoidance at the user interfaces of the receiver, according to one or more embodiments shown and described herein.

Referring to FIGS. 3 and 4, block diagrams of using the persona guard system 100 for offensive language avoidance are depicted. The input text 301 and the received text 401 are analyzed by the controller 101 to determine if there is any offensive language based on the personas stored in the persona guard system 100. An offensive probability may be calculated for the text detected with offensive language and compared with a predetermined threshold offensive probability in determining whether to act on the text, such as providing an option to the sender 103 or the receiver 113 to replace the offensive language with empathetic language. Further, any offensive language in the input text 301 and the received text 401 may be replaced by empathetic language to avoid offensiveness to the receiver 113.

In embodiments, the insult detector module 232 of the controller 101 may include a machine-learning algorithm to identify the offensive language in texts. The insult detector module 232 may be trained based on a dataset containing a wide range of texts and corresponding class labels. The class labels may include positive, negative, and neutral. The positive class labels may further be classified as happy, admiring, peaceful, and forgiving. The negative class labels may be classified as depressed, angry, nervous, or violent. The neutral label indicates perceiving both positive and negative emotions or denotes the inability to predict either as positive or negative. For the negative class labels, the texts may be further classified as offensive language or non-offensive language. The offensive language may be further classified as offensive targeted insult individual, offensive untargeted, offensive targeted insult group, and offensive targeted insult other. For the offensive targeted insult individual, offensive targeted insult group, and offensive targeted insult other, the dataset further may include the background and information of the individual, group, or other.

The insult detector module 232 is trained to identify the offensive language associated with the background and information of an individual, group, or other. The insult detector module 232 may attribute the background and information of an individual, group, or other to the personas generated and stored in the controller 101. The training effectiveness of the machine learning algorithm is validated using multiple evaluation metrics, such as precision, recall, and accuracy. The training process can be evaluated by the system using predetermined threshold metrics until the desired level of accuracy is achieved through training. The desired level of accuracy may be denoted as confidence level, a value between 0 and 1. The trained insult detector module 232 may be continuously validated with the input texts 301 and received texts 401 in association with feedback from the sender 103 and receiver 113.

The personalized empathy text rewriter module 242 of the controller 101 may include a machine learning algorithm to replace the offensive language in texts with empathetic language. The personalized empathy text rewriter module 242 may be trained on a dataset containing a wide range of texts and corresponding class labels as described above. Further, the dataset may include replacements of the offensive language with labeled empathetic language, such as words and phrases that demonstrate understanding, compassion, and sensitivity towards the emotions and experiences of an individual, group, or other. The personalized empathy text rewriter module 242 may be trained to provide empathetic language to replace the offensive language detected by the insult detector module 232. The empathetic language may be generated using natural language processing based on the texts having positive or neutral class labels in association with similar backgrounds and information of an individual, group, or other. The personalized empathy text rewriter module 242 may be learned to generate the empathetic language used for similar usage and intended purpose considering the context of the texts and dialogues between the sender 103 and receiver 113. An evaluation may be conducted to access the performance of the trained machine learning algorithm using evaluation metrics that capture empathetic language characteristics, such as response appropriateness, sensitivity to emotions, and understanding of user needs. The training effectiveness of the machine learning algorithm is validated using multiple evaluation metrics, such as precision, recall, and accuracy. The training process can be evaluated by the system using predetermined threshold metrics until the desired level of accuracy is achieved through training. The trained personalized empathy text rewriter module 242 may be continuously validated with the input texts 301 and received texts 401 in association with feedback from the sender 103 and receiver 113.

In embodiments, personas 227 and the texts (e.g. the input text 301 at the user interface 104 of the sender 103 or the received text 401 at the user interface 104 of the receiver 113) are fed into the insult detector module 232 to determine whether offensive language may exist in the text. The insult detector module 232 may include one or more machine learning algorithms in a neural network 332. The machine learning algorithms may be pre-trained with comments of people with different backgrounds or ideologies, including the comments of the sender 103 and a plurality of receivers 113. The machine learning algorithms may be continuously trained with the comments and input text 301 of the sender 103 and received text 401 of the receivers 113. One machine learning algorithm in the neural network 332 may identify one or more topics and one or more perspectives of the text.

Another machine learning algorithm in the neural network 332 may determine whether the text includes offensive language that may offend the receiver 113 based on the perspective of the text and the perspective of the receiver regarding the topic of the text. If the answer is no yes (no to the determination of offensive language 334), the text may be displayed on the user interface. Conversely, if the answer is yes (yes to the determination of offensive language 334), the text may be fed to the personalized empathy text rewriter module 242 to generate personalized empathy text 309 to be displayed on the user interface 104. In some embodiments, once the insult detector module 232 identifies the presence of offensive language (yes to the determination of offensive language 334), it may receive a persona of the sender 103 from the personas 227 and utilize a separate neural network 432 to ascertain whether there is any ambiguity 434 in the text. If ambiguity is detected, the personalized empathy text rewriter module 242 may generate personalized empathy text that is unambiguous. The personalized empathy text rewriter module 242 may further provide an explanation of the ambiguity with the underlying intent of the sender 103 at the user interface 104.

The insult detector module 232 may detect an offensive language existing in a text in association with an offensive probability at a preset confidence level. After detecting offensive languages in the text. The insult detector module 232 may determine an offensive probability to each offensive language, indicating the likelihood of offensiveness. The determination may be based on the receiver's 113 background and negative labeled texts in association with the individuals, group, or other having similar backgrounds as the receiver 113. In one embodiment, the insult detector module 232 may calculate the offensive probability based on the number of offensive languages detected. For example, the system may use a formula of probability of offensiveness as (1−(number of offensive languages*(1−confidence level))). In one instance, with a preset confidential level of 90%, the insult detector module 232 may detect 5 different offensive languages existing in the text. Accordingly, the probability of offensiveness is equal to (1−5×0.1)=95%. In other embodiments, the system 100 may consider several of factors in gauging the offensive probability, such as the degree of offensive for different words and phrases, the length of the offensive language, and the percentage of the offensive language in the text, and other similar factors.

Accordingly, system 100 may assign an offensive probability threshold in determining whether to take further actions with the detected offensive languages. For instance, the system 100 may set a threshold of the probability of offensiveness of 95% to automatically modify the input text and 85% to pop up a warning window in the user interface stating that the text may contain offensive language.

As illustrated in FIG. 3, the sender controller 102 (e.g. as illustrated in FIG. 1) may detect that the sender 103 provides input texts 301 at the user interface 104 to be sent to a receiver 113 (e.g. as illustrated in FIG. 1). The sender controller 102 may feed the input text 301 to the insult detector module 232 of the controller 101 (e.g. as illustrated in FIG. 2).

The sender controller 102 further determines the identification of the receiver 113 that matches a known receiver in the personas 227, and feds the receiver persona that matches the receiver 113 to the insult detector module 232. A persona includes a plurality of topics and a plurality of perspectives. In a persona of a specific user, each perspective is associated with a topic. A perspective is a positive perspective, a neutral perspective, or a negative perspective.

In embodiments, after identifying the receiver 113 and the receiver persona, the sender controller 102 may further provide the background of the receiver 113 and the perspective of the receiver on the topic on the user interface of the sender. The sender controller 102 may provide an option for the sender 103 to input one or more perspectives of the receiver 113 associated with the topic of the input text 301 on the user interface 104.

After the input text 301 and the receiver persona are fed, the insult detector module 232 may analyze the input text 301 to identify a topic and a perspective of input text 301, and further determine a perspective of the receiver 113 based on the topic of input text 301 and the receiver persona.

In embodiments, the topic is identified by using a natural language processing analysis. The insult detector module 232 may preprocess the input text 301, such as removing stop words, punctuation, and other unnecessary characters, stemming and lemmatization to reduce words to their root form. The insult detector module 232 may then identify the topic words and phrases using different methods, such as bag-of-words, TF-IDF, and n-grams. The bag-of-words method counts the number of times each word appears in the text to create a vector representation of the text. The TF-IDF method further weights the importance of each word in the text based on its frequency and how often it appears in other documents. The TF-IDF may create an accurate representation of the text. The n-grams method may consider groups of n-words together, such as bigrams (two words) or trigrams (three words) to identify common phrases and patterns in the text. The topic words and phrases may be clustered into topics. The clustering step may be done in a machine learning algorithm, such as k-means clustering or latent Dirichlet allocation, as provided in the neural network 332 of the insult detector module 232. For example, the neural network 332 may analyze word co-occurrence patterns to identify groups of words that frequently appear together and assigns probabilities to each topic for a given document. The natural language processing analysis may further use a named entity recognition method to incorporate named entity recognition to identify and classify named entities within the input text 301. Named entities may include, without limitation, names of people, organizations, locations, dates, and other specific entities. The named entity recognition method can leverage the neural network 332 to recognize and categorize these entities into predefined categories. As such, the natural language processing analysis may determine topics in the input text 301 with an assigned topic label, probability distributions, or identified named entities.

In some embodiments, the natural language processing analysis may include calculating the term frequency of each word in the input text and calculating distances between the words. The insult detector module 232 may calculate distances between words in the input text 301. The distances can be measured using various techniques such as Euclidean distance, cosine similarity, or other similarity measures. These distances capture the semantic or contextual relationships between words, indicating how closely related or similar they are within the text. Based on the calculated term frequencies and distances, the insult detector module 232 may identify topics or relationships within the input text.

This may involve clustering similar words together or identifying words that frequently co-occur, suggesting they are related in meaning or context.

The insult detector module 232 may identify the perspective of the input text 301 using sentiment analysis. After the preprocessing as disclosed above, the insult detector module 232 may utilize a sentiment lexicon or a trained machine learning algorithm specifically designed for sentiment analysis, such as the neural network 332. The sentiment lexicon may consist of a predefined set of words or phrases along with their associated sentiment scores (e.g., positive, negative, or neutral). Alternatively, the machine learning algorithm has been trained on labeled data to predict the sentiment of a given text. The insult detector module 232 may apply the sentiment lexicon or machine learning algorithm in the neural network 332 to assign sentiment scores to the words or phrases in the input text 301. This involves matching the words or phrases with entries in the lexicon or using the trained model to predict sentiment. The sentiment scores indicate the degree of positive, negative, or neutral sentiment associated with each word or phrase. The insult detector module 232 may then aggregate the sentiment scores to determine an overall sentiment for the input text. The aggregation may include summing the scores, calculating averages, or other aggregation techniques. Based on the overall sentiment score, the insult detector module 232 may classify the input text 301 into sentiment categories, such as positive, negative, neutral, or potentially more granular sentiment classes. The insult detector module 232 may generate the result of the sentiment or perspective of the input text 301, for example as a positive, neutral, or negative perspective. In some embodiments, the insult detector module 232 may also generate the sentiment category, sentiment score, or other relevant information related to the sentiment analysis. The insult detector module 232 may identify the perspective of the received text 401 using sentiment analysis in the same manner as described above.

The insult detector module 232 may further determine, by comparing the perspective of the input text 301 or the received text 401 and the perspective of the receiver 113, whether the input text 301 or the received text 401 includes offensive language. The insult detector module 232 may provide reasons for the input text being offensive on the user interface 104, such as economic status, education level, race, LGBTQ, gender, disability, mental health, or culture. For example, the insult detector module 232 may find the input text 301 is offensive because the input text 301 involves derogatory remarks or stereotypes about people of lower socio-economic backgrounds, such as unmotivated, dependent on government assistance or welfare programs, criminal behavior, lack of intelligence, irresponsible financial behavior, limited aspiration, or lack of personal responsibility. For example, the tone of the input text 301 to topic A suggests a positive perspective while according to the persona of the receiver 113, the receiver may have a negative perspective to topic A. The insult detector module 232 may determine that such a difference of perspective is caused by the economic status difference between the sender 103 and the receiver 113 and the sender 103 is not sensitive to the topic as the receiver 113 is.

After determining that the input text 301 or the received text 401 does not include offensive language, the insult detector module 232 displays the input text or the received text on the user interface without any change. Alternatively, after determining that the input text includes offensive language, the personalized empathy text rewriter module 242 of the controller 101 (e.g. as illustrated in FIG. 2) may be operated to avoid the offensive language being transmitted to the receiver 113 or being seen by the receiver 113. In one example, the personalized empathy text rewriter module 242 may overwrite the input text 301 or received text 401 with empathetic language. In another example, the personalized empathy text rewriter module 242 may provide an option to modify the input text with empathetic language on the sender's user interface 104 or on the receiver's user interface 114.

In embodiments, the personalized empathy text rewriter module 242 may flag the input text 301 in the original that could be interpreted by the receiver 113 as offensive and provide reasons why the language may be hurtful or offensive to the receiver 113. The personalized empathy text rewriter module 242 may also flag the empathetic language in comparison with the input text 301 in the original form, and provide reasons why the input text 301 in the rewritten form is empathetic. For example, the personalized empathy text rewriter module 242 may tag the offensive words or phrases with a generic placeholder, like "<OFFENSIVE>." The personalized empathy text rewriter module 242 may search the internet or a built-in database for replacement with inclusive and empathetic words of the offensive words from the original text. If a match is found, the personalized empathy text rewriter module 242 may add the empathetic word or phrase to a list of empathetic language examples that matches the offensive word or phrase for future use. Based on the receiver persona, the personalized empathy text rewriter module 242 may select the appropriate empathetic language examples to compare against the rewritten text. The personalized empathy text rewriter module 242 then provides the flagged text, a list of offensive words found, and any empathetic language identified in the rewritten text. After text modification, the system 100 may determine whether the offensive probability decreases to a desired value, for example, below the offensive probability threshold. Upon determining the offensive probability of the text may still exceed the preset offensive probability, the system 100 may remodify the text to lower the offensive probability to the desired value.

In embodiments, the sender 103 may decide not to change the input text 303 as the sender drafted and send an order to the sender controller 102 on the user interface 104 to send the input text without modification with empathetic language. The sender controller 102 may provide a warning or an option to defer sending the input text 301 in the original form on the user interface 104. For example, the user interface 104 may present a dialog box with a warning message and provide elective buttons to revisit the input text 301 after a certain period, such as, without limitation, 10 minutes, 30 minutes, 1 hour, 5 hours, 10 hours, 1 day, or any span of time.

Referring to FIG. 4, the block diagram is depicted about the offensive language avoidance at the user interface 104 of the receiver 113. After the receiver 113 receives a received text 401, the receiver controller 112 may not directly display the received text 401 on the user interface 104 of the receiver 113. Instead, the receiver controller 112 may feed the received text 401 and the person of the receiver 113 from the personas 227 to the insult detector module 232. The insult detector module 232 may utilize a machine learning algorithm in the neural network 332 to determine whether offensive language exists in the received text 401. If offensive language is not detected (no to the determination of offensive language 334), the received text 401 may be displayed on the user interface 104 of the receiver 113.

If offensive language is detected (yes to the determination of offensive language 334), the insult detector module 232 may further determine whether the offensive language is ambiguous. The insult detector module 232 may use a machine learning algorithm in the neural network 432 to determine the ambiguity based on the persona of the sender 103 from the personas 227. After determining that the ambiguity does not exist (no to the determination of ambiguity 434), the personalized empathy text rewriter module 242 may replace the received text 401 with a personalized empathy text on the user interface 104 of the receiver 113. After determining that the ambiguity exists (yes to the determination of ambiguity 434), the personalized empathy text rewriter module 242 may replace the received text 401 with a personalized empathy text without ambiguity 409 on the user interface 104 of the receiver 113, the personalized empathy text rewriter module 242 may provide the reasons for the ambiguity of the offensive language in the user interface 104 of the receiver 113. Further, the personalized empathy text rewriter module 242 may provide underlying intentions or objectives of the sender 103 in the received text on the user interface 104 of the receiver 113.

In embodiments, the personalized empathy text rewriter module 242 may provide the reasons for the ambiguity of the offensive language in the user interface 104 of the receiver 113, such as lack of context, language nuance and multiple meanings, tone and sarcasm, the cultural and regional difference between the sender 103 and the receiver 113, sender's 103 communication style, emotional or psychological states of the sender 103, or simplicity assumptions of the sender 103. In particular, the reasons may further include the insensitivity of the sender 103 to the receiver's 113 economic status, educational level, race, LGBTQ, disability, mental health, or culture. After the receiver 113 understand the reasons for the sender 103 to send an ambiguous and/or offensive text to the receiver 113, receiver 113 may have an option to communicate to the sender 103 to interpret what is the offensive language in the received text 401 and how that offend the receiver 113.

Figure 5:
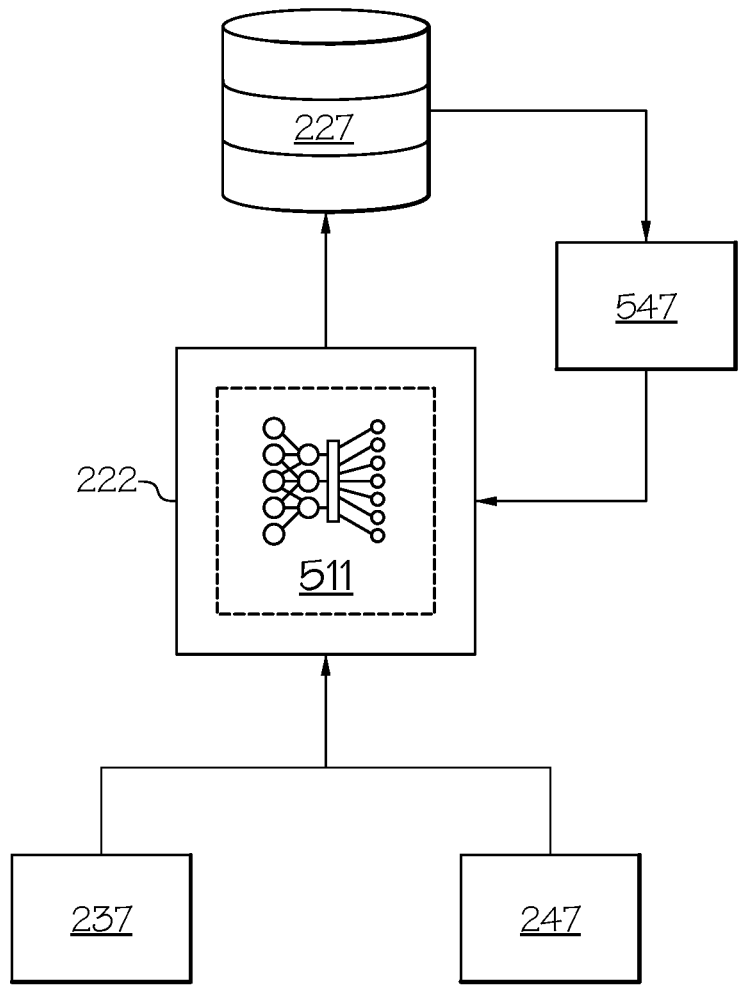
FIG. 5 schematically depicts an example block diagram of generating personas using a persona generator module, according to one or more embodiments shown and described herein.

Referring to FIG. 5, a block diagram of method to generate personas 227 using a persona generator module 222 is depicted. A persona is generated by labeling one or more comments of the receiver with tags, the tags comprising the topics and the perspectives of the receiver. The personas may include the backgrounds of the sender 103 or the receivers 113, such as race, culture, gender, ideology, and physical and mental conditions.

The historical comments and input texts of the sender 237 and historical comments and input texts of the receiver 247 may be fed into the persona generator module 222 to generate personas 227. The persona generator module 222 may have one or more machine learning algorithms in a neural network 511. The one or more machine learning algorithms may analyze the fed comments and texts in association with the sender 103 and one or more receivers 113 and generates a plurality of topics and a plurality of perspectives, where each receiver and sender may have a perspective (positive, neutral, or negative) towards a specific topic. The neural network 511 may be pre-trained with comments of people with different backgrounds or ideologies, including the comments of the sender 103 and a plurality of receivers 113. The neural network 511 may be continuously trained with input text 301 and received text 401. Further, the controller 101 may receive feedback 547 from the sender 103 and receivers 113 to verify the one or more machine learning algorithm in the neural network 511 against the personas 227, and further update the neural network 511.

In embodiments, the controller 101, including the sender controller 102 and receiver controller 112, collects the input text 301 and received text 401 and stored them in the historical comments and input texts of the sender 237 and historical comments and input texts of the receiver 247, accordingly. The historical comments and input texts of the sender 237 and historical comments and input texts of the receiver 247 may further include the sender and the receiver's comments, such as articles and posts written or reposted by the sender 103 and receivers 113.

The persona generator module 222 may determine a perspective for a specific topic based on the sender 103 or the receiver's 113 previous comment. For example, the persona generator module 222 may collect the sender or the receiver's comments from various sources, such as social media platforms, online forums, and blog posts and identify any recurring themes or patterns related to their perspective on the topic. The persona generator module 222 may give more weights to any specific arguments, opinions, or beliefs that the sender 103 or the receiver 113 has expressed. Further, the persona generator module 222 may tag any keywords or phrases that indicate stance, emotional language (such as "unfair" or "unjust"), tone (passionate or indifferent) of the sender 103 or the receiver 113 on the topic. The persona generator module 222 may pay attention to the environmental information and context for the comments of the sender 103 or the receiver 113. For example, whether the event or story the sender 103 or the receiver 113 comments are emerging or traditional, whether the sender 103 or the receiver 113 engages in debating with another person. The persona generator module 222 may use such environmental information and context to better understand the perspective of the sender 103 or the receiver 113. In embodiments, a receiver 113 may voluntarily share the personal information to the personal guard system 100, such as background, disability, nationality, and other information. The personal information may be used as a basis to infer how the receiver 113 may perceives and reacts to specific words, phrases, and topics. The information may be integrated into the receiver's 113 profile and persona. It allows the other users of the system 100 to send customized content, text, and accommodations tailored to the receiver's 113 expectations or preferences.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including matters of logic with respect to the arrangement of steps, operational flow, order of components, or orientation of components; plain meaning derived from grammatical organization or punctuation, and; the number or type of embodiments described in the specification.

Figure 6:
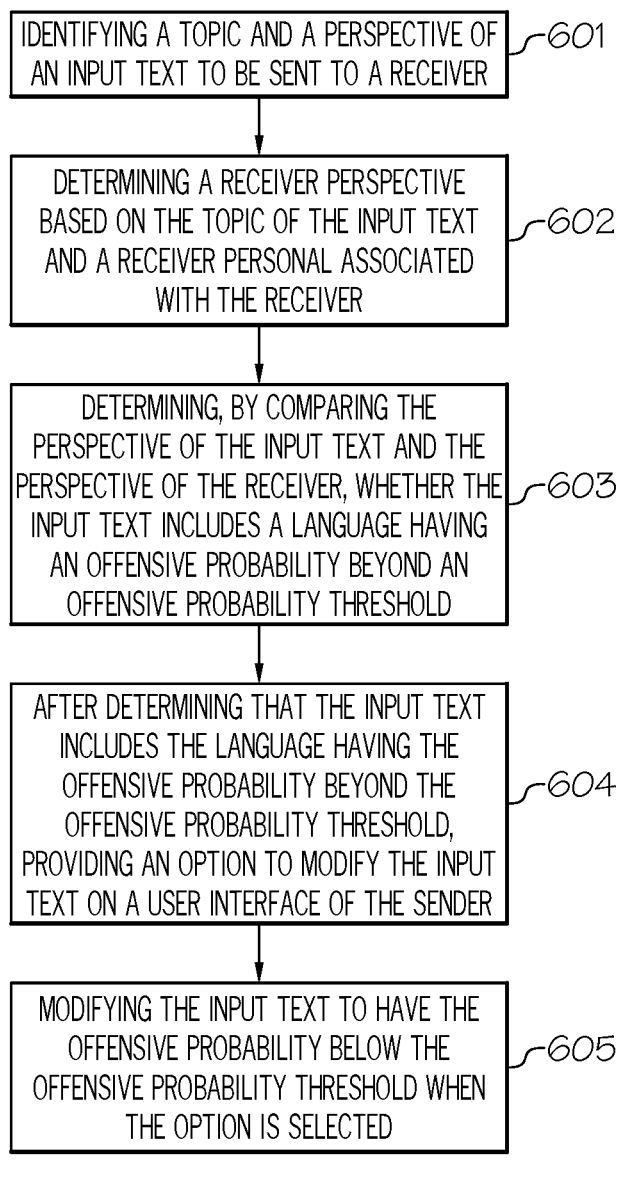
FIG. 6 illustrates a flow diagram of illustrative steps for avoiding offensive language based on personas, according to one or more embodiments shown and described herein.

Referring to FIG. 6, an example flow diagram of illustrative steps for avoiding offensive language based on personas is illustrated. At block 601, the method for avoiding offensive language based on personas includes identifying a topic and a perspective of an input text to be sent to a receiver. The perspective may be a positive perspective, a neutral perspective, or a negative perspective. The topic of the input text may be identified by using a natural language processing analysis.

At block 602, the method for avoiding offensive language based on personas includes determining a receiver perspective based on the topic of the input text and a receiver persona associated with the receiver. The receiver persona may include a plurality of topics and a plurality of receiver perspectives, wherein each of the plurality of receiver perspectives is associated with one topic of the plurality of topics. The receiver persona may be generated by labeling one or more comments of the receiver with tags, the tags comprising the topics and the receiver perspectives.

At block 603, the method for avoiding offensive language based on personas include determining, by comparing the perspective of the input text and the perspective of the receiver, whether the input text includes a language having an offensive probability beyond an offensive probability threshold.

At block 604, the method for avoiding offensive language based on personas includes after determining that the input text includes the language having the offensive probability beyond the offensive probability threshold, providing an option to modify the input text on a user interface of the sender. The method may further include providing the background of the receiver and the perspective of the receiver on the user interface, and providing offensive reasons for the input text being offensive on the user interface. The method may include after receiving an order to send the input text without modification with the empathetic language, providing a warning or an option to defer sending the input text on the user interface. The method may include determining whether an ambiguity exists in the offensive language based on a sender persona associated with a sender, and after determining that the ambiguity exists, providing ambiguity reasons for the ambiguity on the user interface and providing underlying intentions or objectives of the sender on a receiver user interface.

At block 605, the method for avoiding offensive language based on personas includes modifying the input text to have the offensive probability below the offensive probability threshold when the option is selected.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A method comprising identifying a topic and a perspective of an input text to be sent to a receiver from a sender;

determining a receiver perspective based on the topic of the input text and a receiver persona associated with the receiver;

determining, using a trained machine learning module and by comparing the perspective of the input text and the perspective of the receiver, whether the input text includes a language having an offensive probability beyond an offensive probability threshold;

after determining that the input text includes the language having the offensive probability beyond the offensive probability threshold, providing an option to modify the input text on a user interface of the sender;

modifying, using the trained machine learning module, the input text to have the offensive probability below the offensive probability threshold when the option is selected;

determining whether the language having the offensive probability beyond the offensive probability threshold comprises ambiguity based on a sender persona associated with the sender;

in determining that the language comprises the ambiguity, providing an ambiguity reason for the ambiguity on the user interface, wherein the ambiguity reason comprises tone and sarcasm, cultural and regional difference between the sender and the receiver, sender's communication style, or emotional or psychological states of the sender;

wherein:

the trained machine learning module is trained based on texts and corresponding class labels, the class labels comprising positive class labels, negative class labels, and neutral class labels;

the positive class labels comprise happy, admiring, peaceful, or forgiving;

the negative class labels comprise depressed, angry, nervous, or violent; and the negative class labels further comprise targeted offensive language label or untargeted offensive language label, each targeted offensive language label being associated with a target individual or a targeted group.

2. The method of claim 1, wherein the receiver persona comprises topics and receiver perspectives, wherein one receiver perspective of the receiver persona is associated with one topic of the receiver persona.

3. The method of claim 2, wherein the receiver persona is generated by labeling one or more comments of the receiver with tags, the tags comprising the topics and the receiver perspectives.

4. The method of claim 1, wherein the topic of the input text is identified by using a natural language processing analysis.

5. The method of claim 1, wherein the perspective is a positive perspective, a neutral perspective, or a negative perspective.

6. The method of claim 1, wherein the method further comprises providing a background of the receiver and the perspective of the receiver on the user interface.

7. The method of claim 1, wherein the method further comprises providing an offensive reason for the input text being offensive on the user interface.

8. The method of claim 1, wherein the method further comprises:

after receiving an order to send the input text without modification, providing a warning or an option to defer sending the input text on the user interface.

9. The method of claim 1, wherein the method further comprises:

after determining that the ambiguity exists, providing underlying intentions or objectives of the sender on a receiver user interface.

10. A system comprising a controller and a user interface, the controller performing operations comprising:

identifying a topic and a perspective of an input text to be sent to a receiver from a sender;

determining a receiver perspective based on the topic of the input text and a receiver persona associated with the receiver;

determining, using a trained machine learning module and by comparing the perspective of the input text and the perspective of the receiver, whether the input text includes a language having an offensive probability beyond an offensive probability threshold;

after determining that the input text includes the language having the offensive probability beyond the offensive probability threshold, providing an option to modify the input text on a user interface of the sender;

modifying, using the trained machine learning module, the input text to have the offensive probability below the offensive probability threshold when the option is selected;

determining whether the language having the offensive probability beyond the offensive probability threshold comprises ambiguity based on a sender persona associated with the sender;

in determining that the language comprises the ambiguity, providing an ambiguity reason for the ambiguity on the user interface, wherein the ambiguity reason comprises tone and sarcasm, cultural and regional difference between the sender and the receiver, sender's communication style, or emotional or psychological states of the sender;

wherein:

the trained machine learning module is trained based on texts and corresponding class labels, the class labels comprising positive class labels, negative class labels, and neutral class labels;

the positive class labels comprise happy, admiring, peaceful, or forgiving;

the negative class labels comprise depressed, angry, nervous, or violent; and the negative class labels further comprise targeted offensive language label or untargeted offensive language label, each targeted offensive language label being associated with a target individual or a targeted group.

11. The system of claim 10, wherein the receiver persona comprises topics and receiver perspectives, wherein one receiver perspective of the receiver persona is associated with one topic of the receiver persona.

12. The system of claim 11, wherein the receiver persona is generated by labeling one or more comments of the receiver with tags, the tags comprising the topics and the receiver perspectives.

13. The system of claim 10, wherein the topic is identified by using a natural language processing analysis.

14. The system of claim 10, wherein the perspective is a positive perspective, a neutral perspective, or a negative perspective.

15. The system of claim 10, wherein the operations further comprise providing a background of the receiver and the perspective of the receiver on the user interface.

16. The system of claim 10, wherein the operations further comprise providing an offensive reason for the input text being offensive on the user interface.

17. The system of claim 10, wherein the operations further comprise:

after receiving an order to send the input text without modification, providing a warning or an option to defer sending the input text on the user interface.

18. The system of claim 10, wherein the operations further comprise:

after determining that the ambiguity exists, providing underlying intentions or objectives of the sender on a receiver user interface.

\* \* \* \* \*